United States Patent

[11] 3,538,808

[72] Inventor Artur Fischer
  133 Grunmettstetterstrasse D-7241,
  Tumlingen, Germany
[21] Appl. No. 773,991
[22] Filed Nov. 7, 1968
[45] Patented Nov. 10, 1970
[32] Priority Nov. 13, 1967
[33] Germany
[31] 1,625,337

[54] EXPANSION ANCHOR
  7 Claims, 3 Drawing Figs.
[52] U.S. Cl. ..................................... 85/70,
  85/74, 85/75
[51] Int. Cl. ..................................... F16b 13/06
[50] Field of Search ........................... 85/70, 71,
  73, 74, 75, 76, 77, 78, 67, 69

[56] References Cited
  UNITED STATES PATENTS
  462,601  11/1891  Thinnes ..................... 85/75
  570,786  11/1896  Church ....................... 85/67
  1,035,277  8/1912  Veres ........................ 85/75
  1,431,176  10/1922  Ogden ....................... 85/70
  1,878,600  9/1932  Pleister ..................... 85/71
  2,955,504  10/1960  Lovrinch .................... 85/75

FOREIGN PATENTS
  344,832  4/1960  Switzerland ................. 85/73
  444,623  3/1936  Great Britain ............... 85/73
  1,266,450  5/1961  France ....................... 85/74

Primary Examiner—Marion Parsons, Jr.
Attorney—Michael S. Striker

ABSTRACT: An expansion anchor having an elongated expansible sleeve of predetermined outer diameter. A conical expander member is insertable into the front end of the sleeve. An actuating member, such as a screw, is insertable into the rear end of the sleeve and connectable with the expander member which extends into the front end of the sleeve for the purpose of drawing the expander member deeper into the sleeve and thereby spreading the latter radially. The trailing portion of the actuating member which remains located outside the sleeve has a diameter which corresponds to the outer diameter of the sleeve.

Patented Nov. 10, 1970 3,538,808

Inventor:
ARTUR FISCHER

By Michael S. Striker
Attorney

EXPANSION ANCHOR

BACKGROUND OF THE INVENTION

The present invention relates generally to an expansion anchor, and more particularly to the type of expansion anchor wherein an expansion anchor sleeve is expanded radially by drawing an expander element into the sleeve from one end via an actuating member which extends into the sleeve from the other end.

Expansion anchors of this type are used particularly for applications where heavy objects must be secured to a support, such as a wall. This includes the mounting of furniture on walls, the mounting of heavy appliances and the like. Expansion anchors of this type are introduced into a bore hole which is provided in the support, which hereafter for the sake of convenience will be identified as a wall. The expansion anchor sleeve has a central passage into which an expanding or actuating member is inserted so as to engage the expanding element located at the front or leading end of the sleeve within the bore hole, to thereby draw the expanding element into the sleeve and expand the latter radially. Because the actuating member, hereafter for the sake of convenience identified as a screw, is introduced into the central bore or passage of the expansion anchor sleeve, its outer diameter is smaller than the outer diameter of the sleeve itself. The differential between these two diameters depends on different factors, including the relative strength of the materials used for the expansion anchor sleeve and for the screw, and also upon the dimensions of the expanding element. The dimensions of the latter depend upon the extent to which the expansion anchor sleeve must be radially expanded in order to provide a tight seating of the sleeve in the bore hole of the wall. The stronger this spreading or radial expansion is to be, the greater must be the diameter differential between the opposite ends of the expanding member, that is the end of the expanding member which is inserted into the leading end of the sleeve, and the other end of the expanding member. On the other hand, the largest outer diameter of the expanding element must be no greater than the outer diameter of the sleeve in unexpanded state because otherwise it would not be possible to introduce the expanding element into the bore hole. This means that, if a particularly pronounced radial expansion of the sleeve is to be obtained, the diameter at the opposite end of the expanding element must be as small as possible. This, in turn, requires that the outer diameter of the screw be small. Depending upon the type of material of which the wall is constructed, for instance concrete, it is therefore possible that the strength of the screw is not sufficient to provide the maximum amount of radial expansion, and therefore the maximum retentive strength of the expansion anchor in the bore hole, which it would be possible to achieve. A further problem with existing expansion anchors of the general type in question is the manner in which the supported object is to be affixed to the wall. To facilitate the installation it is known to provide a bore hole simultaneously both in the object to be supported and in the wall, the former having been positioned in its final location before the bore is provided. The bore, both in the supported object and the wall, corresponds in its diameter to the outer diameter of the expansion anchor sleeve so that the latter can simply be inserted through the bore in the object to be supported and into the bore in the wall, to be expanded therein. However, while the portion of the bore in the wall is of proper size for the expansion anchor sleeve, that portion of the bore which is in the object being supported is too large, keeping in mind that the diameter of the screw is smaller than the outer diameter of the expansion anchor sleeve. This results in a certain amount of freedom of movement of the object with respect to the wall before the object will be supported by the screw.

Finally, if the bore hole in the wall is made deeper than the length of the expansion anchor sleeve, either accidentally or on purpose to assure that breaking-away of the material of the wall in the region of the inlet end of the bore is prevented when the expansion anchor is expanded, there will be a portion of the bore between the curling end of the expansion anchor sleeve at the inlet end of the bore in which the smaller-diameter screw will be completely unsupported by the surrounding wall. In this portion the screw will be subjected to bending stresses, a fact which is highly undesirable. While it is possible to minimize this to some extent by subjecting the screw to a higher tensile stress, this remedy is limited by the ability of the wall material to withstand such tensile stresses, it being understood that stresses in excess of this factor will tear the sleeve out of the wall with the material bounding the bore hole crumbling and giving way.

It is, accordingly, an object of the present invention to provide an expansion anchor which is not subject to these disadvantages.

An additional object of the invention is to provide such an expansion anchor which is simple and economical in its construction.

SUMMARY OF THE INVENTION

In pursuance of the objects above, and others which will become apparent hereafter, one feature of my invention resides in the provision of an expansion anchor having an elongated expansible expansion-anchor sleeve provided with a leading end and a trailing end. The sleeve is of a predetermined outer diameter. An expander member extends into the leading end and is arranged to radially expand the sleeve in the region of the leading end when it is displaced in the direction towards the trailing end of the sleeve. Finally, actuating means in form of an actuating element is provided, the trailing portion of the actuating element having an outer diameter which corresponds to that of the sleeve and the leading portion being of smaller diameter extending into and through the sleeve into engagement and connection with the expander member. The actuating means serves to displace the expander member towards the trailing end of the sleeve to thereby expand the latter.

By virtue of the fact that the trailing portion of the actuating element which at all times will be located outside the trailing end of the sleeve has an outer diameter corresponding to that of the sleeve, the bore hole will at all times be completely filled and the aforementioned disadvantageous possibilities relating to increased bending stresses, in proper support of the article to be supported, and the like, are avoided.

That proportion of the actuating element which has the larger outer diameter corresponding to that of the sleeve, that is the trailing portion, is capable of withstanding their greater tensile stresses than the leading portion which is of smaller diameter. In fact, the tensile stresses which the trailing portion can withstand will generally be in excess of the withdrawing stresses which the material of the wall can withstand without breaking and thus permitting the expansion anchor to be torn loose. This is not necessarily true of the leading portion of the actuating element, however, and evidently this possibility is highly undesirable. Accordingly, it is within the concept of the invention to increase the break resistance of the smaller-diameter leading portion of the actuating element over that of the trailing portion. This may be accomplished by subjecting the smaller portion to a heat treatment for hardening purposes, or to another suitable treatment. Alternately, the actuating element may consist of two discrete portions which are of course suitably connected with one another, but with the leading portion consisting of a material having better strength characteristics than that of the trailing portion. Advantageously, the tensile strength of the leading portion with respect to the cross-sectional dimensions of the latter may be substantially the same as the tensile strength of the trailing portion as related to the cross-sectional dimensions of that particular portion. This assures, in other words, that the two portions can withstand tensile strength which are substantially of identical magnitude.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
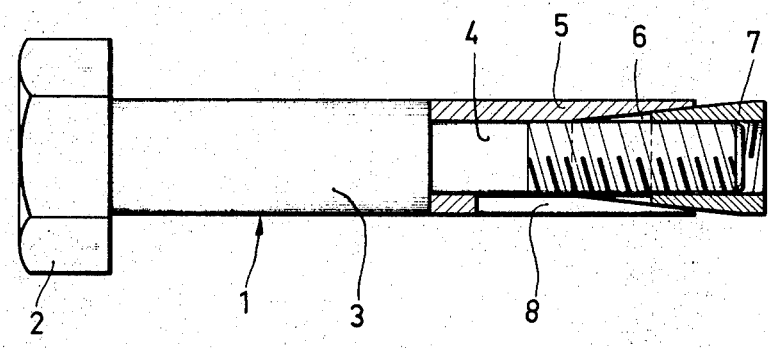
FIG. 1 is a longitudinal view, partly in section, of an expansion anchor according to my invention.

In the drawing identical reference numerals identify identical elements in all FIGS. Reference numeral 1 identifies an actuating element, illustrated in FIG. 1 as a screw provided at its trailing end with a head 2. The screw consists of a leading portion 4 and a trailing portion 3, the leading portion 4 being provided with an external screw thread. The leading portion 4 is extended into and through an expansion anchor sleeve 5 consisting of an expansible material. For this purpose the expansion anchor sleeve has a passage 6 which conically diverges in the direction towards its leading end, that is in FIG. 1 the right-hand end which is inserted into the bore hole of the wall in which the anchor is to be secured. An expanded member 7 of conically tapering configuration is provided with an inner bore which is internally screw threaded so that the screw thread of the leading portion 4 of the screw 1 can mesh therewith. It will be clear that as the screw is rotated the expander member 7 will be drawn deeper into the sleeve 5 from the leading end in the direction towards the trailing end, that is from the right-hand side in FIG. 1 to the left-hand side. This results in radial expansion of the expansion anchor sleeve 5 into engagement with the surrounding material of the wall in which the bore hole is formed wherein the sleeve 5 is disposed. To facilitate this radial expansion, the sleeve 5 may be provided with longitudinal slots 8 distributed over its circumference.

In accordance with my invention, the outer diameter of the trailing portion 3 of the screw 1 is substantially the same as outer diameter of the sleeve 5. In this way, the bore hole in the wall as well as in an object to be supported on the wall is completely filled not only in the region of the sleeve, but also in the trailing portion 3 of the screw 1. This accordingly results in support of the portion 3 by the surrounding material of the wall and eliminates to a large extent bending stresses on the portion 3.

Insofar as any remaining bending stresses still exists, the portion 3 is capable of withstanding them because of its larger diameter and its greater resistance to bending, an advantage which holds true even if the portion 3 should project relatively far from the wall and the load supported by the portion 3 is supported relatively distant from the wall. Furthermore, the trailing end of the sleeve 5 can abut against the portion 3 when the expander member 7 is drawn into the leading end of the sleeve 5. This makes it possible to position the expansion anchor in a bore hole at any desired depth without requiring special means for preventing axial shifting of the sleeve as this is known in existing expansion anchors. This, of course, makes it possible to precisely and in a most simplified manner to determine just how far the portion 3 of the screw 2 is to project outwardly beyond the wall. Evidently, this is highly advantageous in general, and also in particular where the object to be supported is to be positioned and supported at a predetermined distance from the exposed surface of the wall in which the bore hole is formed. If, for instance, plate-shaped covering members for the wall are to be supported at a certain distance from the exposed surface of the latter, it is a simple matter to provide screw threads on the portion 3, to thread a first nut member onto the portion 3, place the plate member to be mounted onto the portion 3 by inserting the latter through a hole in the plate member, and securing the plate member by threading a second nut member onto the portion 3 and to engagement with the plate member. Of course, this type of mounting can be accomplished in other ways, for instance by securing the plate member between the head of the screw and the nut member threaded onto the portion 3.

Figure 2:
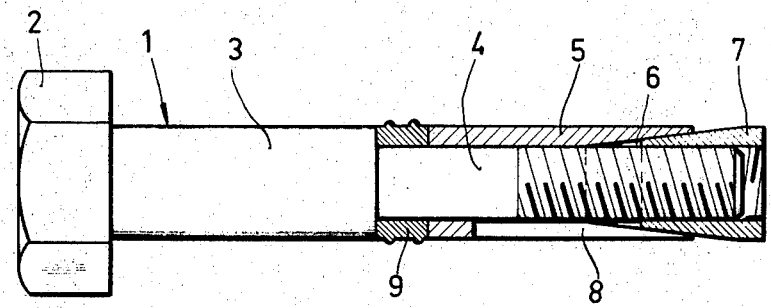
FIG. 2 is a view similar to FIG. 1 but of a further embodiment of my invention.

It will be appreciated that the screw 1 can be threaded into the sleeve 5 and thereby into a bore in which the sleeve 5 is located, only until it abuts against the rear or trailing end of the sleeve 5. Continuing turning of the screw 1 result in drawing the expander member 7 into the sleeve and providing more radial expansion of the latter, but not in inserting the screw 1 deeper into the bore hole. In certain circumstances this may, however, be either desirable or necessary and the embodiment illustrated in FIG. 2 makes this possible. Unlike FIG. 1, the embodiment of FIG. 2 additionally comprises intermediate member 9 located between the trailing end of the sleeve 5 and the portion 3 in the screw 1. As the screw 1 is threaded deeper into the sleeve, or more particularly into the expander member 7, the intermediate member 9 can be deformed elastically or plastically. In other words, if the resistance on radial spreading of the sleeve reaches a certain point so that further drawing-in of the expander member 7 is either impossible or possible only against very strong resistance, then on continued rotation of the screw 1 the intermediate member 9 undergoes either elastic deformation or plastic deformation with radially outward deformation of its material. This makes it possible to introduce the screw 1 more deeply without continued drawing-in of the expander member 7, so that the screw 1 will be inserted into the sleeve and thereby into a bore hole in which the sleeve is located to the desired extent.

The intermediate member 9 may be of one piece with the sleeve 5, or may be a separate member. If it is of one piece, it may be in form of a thin walled deformable extension of the sleeve, or in form of deformable axially and rearwardly extending projections.

An additional advantage of the provision of this intermediate member 9 is the fact that it acts in effect in the same manner as a spring washer, that is it prevents or reduces likelihood of loosening of the screw 1 as a result of vibrations. Fortunately, incidentally, it serves to some extent to absorb.

Figure 3:
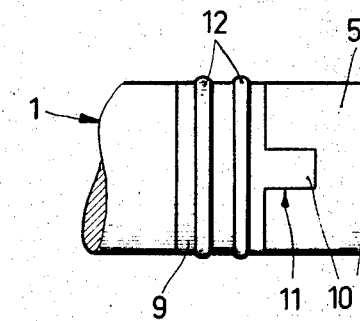
FIG. 3 is a fragmentary detailed view of yet another embodiment of my invention.

It has been found that it is essential to prevent rotation of the expander member 7. In known expansion anchors using such expander members the latter are provided with projections or the like. In accordance with the present invention force is advantageously accomplished by providing, as illustrated in FIG. 3, means for preventing rotation of the intermediate member 9 with respect to the sleeve 5. In FIG. 3 this means is illustrated in the form of an axially extending projection 10 on the intermediate member 9 which engages into a corresponding recess 11 of the sleeve 5. This prevents relative rotation of the intermediate member 9 and the sleeve 5. Because of the elastic or plastic deformation of the intermediate member 9 which takes place under the circumstances described above, so that the material of the intermediate member 9 is radially outwardly deflected, rotation of the intermediate member 9 in the bore hole becomes impossible. The sleeve 5 accordingly cannot also rotate because it is connected with the intermediate member 9. The expander member 7 on being connected with the sleeve 5, the inability of the latter to rotate also prevents the expander member 7 from rotating when the intermediate member 9 firmly engages the surrounding wall of the bore hole. Advantageously, the intermediate member 9 may be provided with projections 12 circumferentially distributed, as shown in FIG. 3, to further enhance its tight frictional engagement with the surrounding wall of the bore hole.

It is clear that various modifications are possible from the illustrative embodiments without departing from the scope of the invention. Evidently, the form of the expander member 7, for instance, can be varied, as can be the inner cross section of configuration of the passage in the sleeve 5. For instance, instead of conically divergent, the passage of the sleeve 5 can be provided with inwardly projecting sections which, when the expander member 7 is introduced, will effect radially outward deflection of the material of the sleeve 5. Also, in place of a single expander member 7, it is possible to use two thereof if it should be desired or considered necessary, for instance to obtain a more uniform expansion.

It will be understood that each of the elements described above, or two or more together, may also find a useful application in other types of constructions differing from the types described above.

While the invention has been illustrated and described as embodied in an expansion anchor, it is not intended to be limited to the details shown, since various modifications and structural changes may be made without departing in any way from the spirit of the present invention.

I claim:

1. An expansion anchor comprising, in combination, an elongated expansible expansion-anchor sleeve having a leading end and a trailing end and being of a predetermined outer diameter; an expander member extending into said leading end and arranged to radially expand the sleeve in the region of said leading end in response to displacement in direction towards said trailing end; actuating means, including an actuating element having a trailing portion whose outer diameter corresponds to that of said sleeve, and a leading portion of smaller diameter extending into said sleeve and connected with said expander member, said actuating means being operative for displacing said expander member towards said trailing end of said sleeve; an intermediate element interposed between said trailing portion and said trailing end and being yieldable in longitudinal direction of said sleeve in response to deeper insertion of said actuating element into the latter; and cooperating male and female engaging portions on said sleeve and said intermediate element for preventing rotation of the two relative to one another.

2. An expansion anchor as defined in claim 1, said leading portion having a break resistance greater than that of said trailing portion.

3. An expansion anchor as defined in claim 2, said trailing portion and said leading portion being discrete elements connected with one another, and said leading portion consisting of a material having greater resistance to breaking than said trailing portion.

4. An expansion anchor as defined in claim 1, said trailing and said leading portion respectively having substantially similar tensile strengths with respect to their respective cross-sectional areas.

5. An expansion anchor as defined in claim 1, said intermediate element undergoing elastic deformation when yielding in longitudinal direction of said sleeve.

6. An expansion anchor as defined in claim 1, said intermediate element undergoing plastic deformation when yielding in longitudinal direction of said sleeve.

7. An expansion anchor as defined in claim 1, further comprising at least one radially extending projection provided on the exterior of said intermediate element.